US011886499B2

(12) United States Patent
Son et al.

(10) Patent No.: US 11,886,499 B2
(45) Date of Patent: Jan. 30, 2024

(54) APPARATUS FOR TRAINING RECOGNITION MODEL, APPARATUS FOR ANALYZING VIDEO, AND APPARATUS FOR PROVIDING VIDEO SEARCH SERVICE

(71) Applicant: ELECTRONICS AND TELECOMMUNICATIONS RESEARCH INSTITUTE, Daejeon (KR)

(72) Inventors: Jeong-Woo Son, Daejeon (KR); Chang-Uk Kwak, Daejeon (KR); Sun-Joong Kim, Sejong-si (KR); Alex Lee, Daejeon (KR); Min-Ho Han, Daejeon (KR); Gyeong-June Hahm, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 367 days.

(21) Appl. No.: 17/166,444

(22) Filed: Feb. 3, 2021

(65) Prior Publication Data
US 2022/0004773 A1 Jan. 6, 2022

(30) Foreign Application Priority Data
Jul. 6, 2020 (KR) .......................... 10-2020-0082871

(51) Int. Cl.
*G06K 9/00* (2022.01)
*G06K 9/46* (2006.01)
(Continued)

(52) U.S. Cl.
CPC ............ *G06F 16/75* (2019.01); *G06F 16/735* (2019.01); *G06F 16/738* (2019.01); *G06F 18/21* (2023.01);
(Continued)

(58) Field of Classification Search
CPC . G06N 3/045; G06N 3/08; G06N 3/04; G06F 16/75; G06F 16/735; G06F 16/785;
(Continued)

(56) References Cited

U.S. PATENT DOCUMENTS 5,845,048 A * 12/1998 Masumoto ............. B25J 9/1697
706/20
10,679,046 B1 * 6/2020 Black ..................... G06V 40/23
(Continued)

FOREIGN PATENT DOCUMENTS

CN 110169055 8/2019
JP 2008-97233 4/2008
(Continued)

*Primary Examiner* — Etienne P Leroux
(74) *Attorney, Agent, or Firm* — KILE PARK REED & HOUTTEMAN PLLC

(57) ABSTRACT

Disclosed herein is an apparatus for analyzing a video shot. The apparatus includes at least one program, memory in which the program is recorded, and a processor for executing the program. The program may include a frame extraction unit for extracting at least one frame from a video shot, a shot composition and camera position recognition unit for predicting shot composition and a camera position for the extracted at least one frame based on a previously trained shot composition recognition model, a place and time information extraction unit for predicting a shot location and a shot time for the extracted at least one frame based on previously trained shot location recognition model and shot time recognition model, and an information combination unit for combining pieces of information, respectively predicted for the at least one frame, for each video shot and tagging the video shot with the combined pieces of information.

18 Claims, 7 Drawing Sheets

(51) Int. Cl.

| | |
|---|---|
| *G06K 9/62* | (2022.01) |
| *G06T 7/70* | (2017.01) |
| *G06T 7/00* | (2017.01) |
| *G11B 27/34* | (2006.01) |
| *G11B 27/10* | (2006.01) |
| *G06N 3/04* | (2023.01) |
| *G06N 3/08* | (2023.01) |
| *G06F 16/735* | (2019.01) |
| *G06F 16/738* | (2019.01) |
| *G06F 16/75* | (2019.01) |
| *G06V 20/40* | (2022.01) |
| *G06F 18/21* | (2023.01) |
| *G06V 10/82* | (2022.01) |

(52) U.S. Cl.
 CPC ............... *G06N 3/04* (2013.01); *G06N 3/08* (2013.01); *G06T 7/0002* (2013.01); *G06T 7/70* (2017.01); *G06V 10/82* (2022.01); *G06V 20/46* (2022.01); *G06V 20/49* (2022.01); *G11B 27/102* (2013.01); *G11B 27/34* (2013.01); *G06T 2207/10016* (2013.01); *G06T 2207/20081* (2013.01); *G06T 2207/30168* (2013.01); *G06T 2207/30244* (2013.01)

(58) Field of Classification Search
 CPC ..... G06F 16/738; G06F 18/21; G11B 27/102; G11B 27/031; G11B 27/28; G11B 27/34; G06T 7/0002; G06T 7/70; G06T 2207/30168; G06T 2207/20081; G06T 2207/10016; G06T 2207/30244; G06V 10/82; G06V 20/46; G06V 20/49
 See application file for complete search history.

(56) References Cited

U.S. PATENT DOCUMENTS

| | | | |
|---|---|---|---|
| 10,681,335 B2 * | 6/2020 | Reunamäki | H04N 23/90 |
| 10,929,672 B2 * | 2/2021 | Rios, III | G06V 20/36 |
| 11,528,429 B2 | 12/2022 | Ikeda et al. | |
| 2003/0002715 A1 * | 1/2003 | Kowald | G11B 27/28 |
| 2005/0104958 A1 * | 5/2005 | Egnal | H04N 7/18 |
| | | | 348/169 |
| 2008/0019661 A1 * | 1/2008 | Obrador | H04N 5/147 |
| | | | 386/210 |
| 2010/0110266 A1 | 5/2010 | Lee et al. | |
| 2011/0085739 A1 | 4/2011 | Zhang et al. | |
| 2012/0123978 A1 * | 5/2012 | Toderice | G06V 20/70 |
| | | | 706/12 |
| 2017/0186147 A1 * | 6/2017 | He | H04L 67/01 |
| 2017/0237896 A1 * | 8/2017 | Tsai | H04N 1/32358 |
| | | | 348/231.99 |
| 2018/0065247 A1 * | 3/2018 | Atherton | B25J 9/163 |
| 2018/0295408 A1 * | 10/2018 | Wu | H04N 7/0255 |
| 2019/0364196 A1 | 11/2019 | Song | |
| 2020/0092465 A1 | 3/2020 | Lee et al. | |
| 2020/0128247 A1 * | 4/2020 | Doshi | G06F 18/2413 |
| 2020/0272652 A1 * | 8/2020 | Ito | G06F 16/5866 |
| 2021/0158570 A1 * | 5/2021 | Mohandoss | H04N 1/6052 |
| 2022/0030163 A1 | 1/2022 | Jung et al. | |
| 2022/0044414 A1 | 2/2022 | Noh et al. | |
| 2022/0139092 A1 * | 5/2022 | Hashimoto | G06N 3/045 |
| | | | 382/156 |
| 2022/0172746 A1 * | 6/2022 | Ikeda | H04N 23/60 |

FOREIGN PATENT DOCUMENTS

| | | |
|---|---|---|
| KR | 10-2018-0058380 | 6/2018 |
| KR | 10-2019-0064958 | 6/2019 |
| KR | 10-2019-0105533 | 9/2019 |
| KR | 10-2020-0044435 | 4/2020 |
| KR | 10-2020-0047267 | 5/2020 |
| WO | 2020/054241 | 3/2020 |

* cited by examiner

APPARATUS FOR TRAINING RECOGNITION MODEL, APPARATUS FOR ANALYZING VIDEO, AND APPARATUS FOR PROVIDING VIDEO SEARCH SERVICE

CROSS REFERENCE TO RELATED APPLICATION

This application claims the benefit of Korean Patent Application No. 10-2020-0082871, filed Jul. 6, 2020, which is hereby incorporated by reference in its entirety into this application.

BACKGROUND OF THE INVENTION

1. Technical Field

The disclosed embodiment relates to technology for analyzing video shots of image content and search technology using the same.

2. Description of the Related Art

Image content, such as a broadcast, a movie, or the like, is created through a process in which a professional producer is involved in producing a large number of video shots and finally editing the same. This process has been refined over decades since image content service began to be provided, and various production techniques are taught in a process of training production personnel. Among these production techniques, image composition is an important medium for emphasizing the story of content and making viewers engrossed in the flow of the story.

Therefore, in a filming process, the same scene may be shot multiple times from different positions and angles, and then appropriate shot composition may be selected in consideration of the overall flow of the video in the final editing process. When video is produced, this process is entrusted to a producer, a program director, or the like, and the producer or director arranges, searches for, and selects shots after checking the same one by one in a manual manner. When image content for commercial use, such as a movie, a documentary, or the like, is produced, thousands of video shots are taken, and selecting shots after checking the same one by one is time-consuming and burdensome from the aspect of labor expenses.

SUMMARY OF THE INVENTION

An object of the present invention is to reduce the time and labor expenses required for a process of producing content by finally editing video shots when image content is produced.

An apparatus for training a recognition model according to an embodiment includes at least one program, memory in which the program is recorded, and a processor for executing the at least one program. The at least one program may include a shot composition recognition model generation unit for generating a neural network model for predicting shot composition and a camera position using a video shot tagged with shot composition information and camera position information as training data; and a shot time and location recognition model generation unit for generating a neural network model for predicting a shot time and a shot location using a video shot tagged with shot time information and shot location information as training data.

Here, the shot composition recognition model generation unit may include a frame extraction unit for extracting at least one frame from the video shot and forming data for each of the at least one frame, an image feature extraction unit for extracting image features related to an object included in the extracted at least one frame, and a recognition-model-training unit for training a shot composition recognition model, which is a neural network model, to predict shot composition information and camera position information, with which the frame is tagged, when the extracted image features are input.

Here, the shot composition may include at least one of an extreme long shot, a long shot, a full shot, a knee shot, a waist shot, a bust shot, a close shot, a close-up shot, an extreme close-up shot, and an over-the-shoulder shot.

Here, each type of the shot composition may be classified as at least one of a high-angle shot, a low-angle shot, and an eye-level shot depending on a camera position.

Here, the shot composition recognition model generation unit may further include a sound feature extraction unit for extracting an audio spectrum from the video shot, and the recognition-model-training unit may train the shot composition recognition model, which is a neural network model, to predict the shot composition information and the camera position information with which the video shot is tagged when the audio spectrum is input.

Here, the shot time and location recognition model generation unit may include a frame extraction unit for extracting at least one frame from the video shot and forming data for each of the at least one frame; and a recognition-model-training unit for training a shot location recognition model or a shot time recognition model to predict shot location information or shot time information with which the frame is tagged when at least one of shot composition of the extracted frame, color distribution thereof, and a key frame is input.

Here, the shot time and location recognition model generation unit may further include, between the frame extraction unit and the recognition-model-training unit, at least one of a shot composition extraction unit for predicting shot composition of the extracted frame based on a previously trained shot composition recognition model, an image feature extraction unit for extracting color distribution from the extracted frame, and a key frame extraction unit for extracting a representative frame, among the at least one extracted frame.

Here, the image feature extraction unit may extract color distribution of each of multiple segmented areas of the frame and color distribution of the entire frame.

An apparatus for analyzing a video shot according to an embodiment includes at least one program, memory in which the program is recorded, and a processor for executing the at least one program. The at least one program may include a frame extraction unit for extracting at least one frame from a video shot, a shot composition and camera position recognition unit for predicting shot composition and a camera position for the extracted at least one frame based on a previously trained shot composition recognition model, a place and time information extraction unit for predicting a shot location and a shot time for the extracted at least one frame based on a previously trained shot location recognition model and a previously trained shot time recognition model, and an information combination unit for combining pieces of information, which are respectively predicted for the at least one frame, for each video shot and tagging the video shot with the combined pieces of information.

The apparatus for analyzing a video shot according to an embodiment may further include a shot quality measurement unit for measuring a shot quality of each of the extracted at least one frame based on predetermined factors, and the information combination unit may select the information to be combined based on the measured shot quality.

Here, the information to be combined may include at least one of shot composition, a camera position, and a shot quality, and the information combination unit may select the shot composition based on a shot quality score totaled for each type of shot composition, select the camera position based on a shot quality score totaled for each camera position, calculate the shot quality as the average of quality scores of frames recognized as having the selected shot composition, and use the shot composition, the camera position, and the shot quality as the information to be combined.

Here, the predetermined factors may include at least one of directionality of lines, which is the degree of uniformity of directions of main lines included in the frame, sharpness, which is the degree of clarity of the lines, and similarity acquired by comparing previously constructed shot composition data with information about an object included in the frame.

Here, the place and time information extraction unit may predict the shot location and the shot time for the extracted at least one frame by inputting at least one of shot composition of the frame, which is predicted based on a previously trained shot composition detection model, color distribution thereof, and a key frame to the shot location recognition model and the shot time recognition model.

Here, the apparatus for analyzing a video shot according to an embodiment may further include a place/time-based grouping unit for clustering frames into predetermined groups according to the predicted shot location and shot time, and the information combination unit may select the information to be combined based on the resultant groups.

Here, the information to be combined may include at least one of a time group and a place group, and the information combination unit may decide on the time group and the place group to be used as the information to be combined based on the number of frames included in each of the groups.

An apparatus for providing a video shot search service according to an embodiment includes at least one program, memory in which the program is recorded, and a processor for executing the program. The program may include a tagging item search unit for searching for a video shot tagged with at least one item corresponding to a search keyword when the search keyword is input; and a video shot output unit for outputting the found at least one video shot.

Here, the item may include at least one of shot composition, a camera position, an actual shot location, and an actual shot time.

Here, the apparatus for providing a video shot search service according to an embodiment may further include a video shot arrangement unit for sorting, when the found video shot comprises multiple video shots, the multiple video shots according to a predetermined criterion, and the video shot output unit may output the video shots in the order set by the video shot arrangement unit.

Here, the video shot arrangement unit may sort the video shots by referring to other items with which each of the multiple video shots is tagged.

Here, the apparatus for providing a video shot search service according to an embodiment may further include a DB for storing film grammar information pertaining to an already produced film, and the video shot arrangement unit may sort the video shots in the order from a video shot tagged with shot composition information that best matches shot composition information of a previously selected video shot based on the film grammar information.

BRIEF DESCRIPTION OF THE DRAWINGS

The above and other objects, features and advantages of the present invention will be more clearly understood from the following detailed description, taken in conjunction with the accompanying drawings, in which.

DESCRIPTION OF THE PREFERRED EMBODIMENTS

Figure 1:
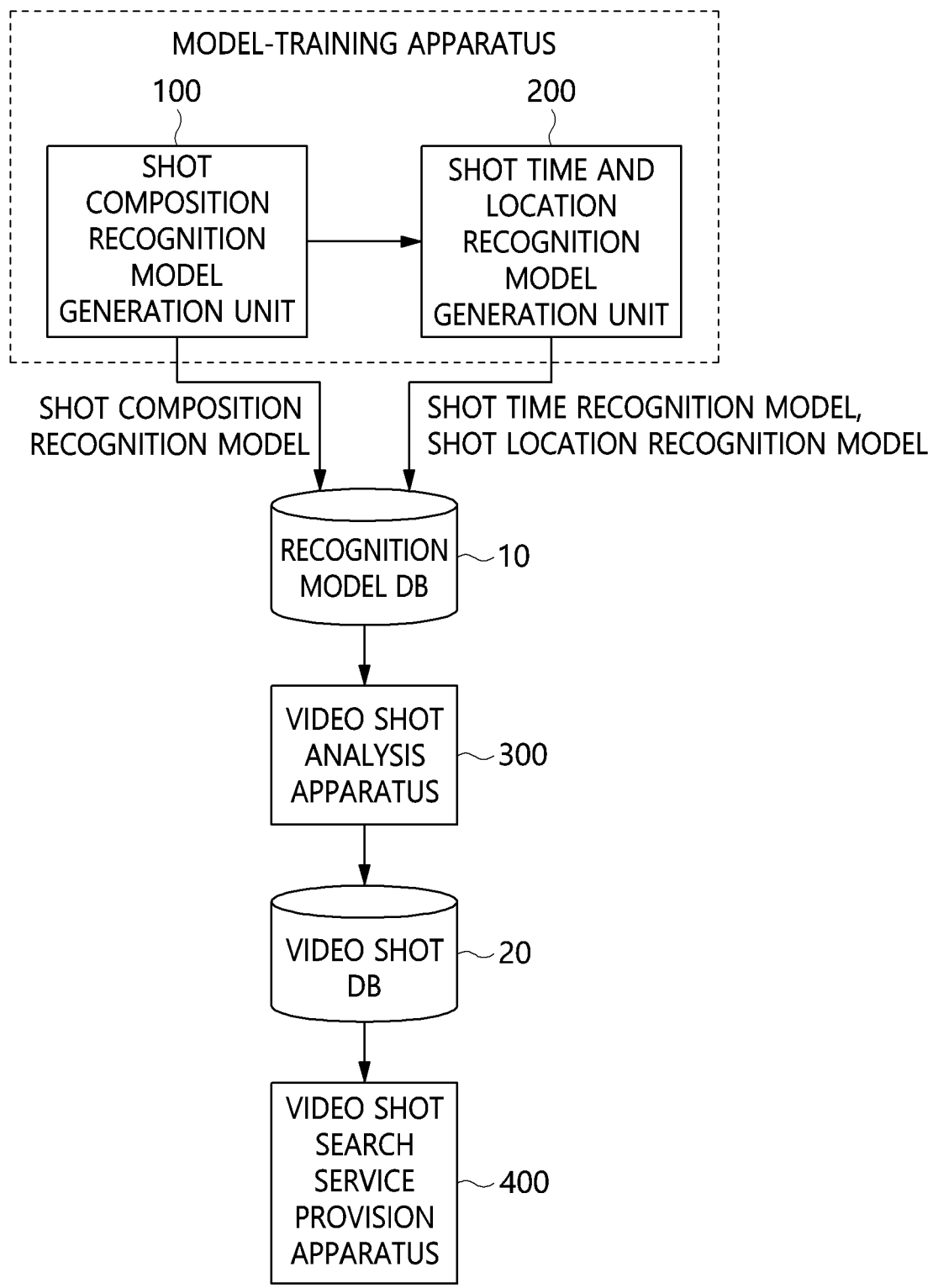
FIG. 1 is a schematic block diagram of a search system based on analysis of video shots of image content according to an embodiment.

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, an apparatus and method according to an embodiment will be described in detail with reference to FIGS. 1 to 8.

FIG. 1 is a schematic block diagram of a search system based on analysis of video shots of image content according to an embodiment.

Referring to FIG. 1, the search system based on analysis of video shots of image content may broadly include a model-training apparatus (100 and 200), a recognition model DB 10, a video shot analysis apparatus 300, a video shot DB 20, and a video shot search service provision apparatus 400.

The model-training apparatus (100 and 200) performs training of an artificial intelligence (AI) recognition model that is capable of recognizing shot composition, a shot time, and a shot location pertaining to a video shot. Specifically, the model-training apparatus may include a shot composition recognition model generation unit 100 (shown in FIG. 2), which generates a neural network model for predicting shot composition and a camera position using a video shot tagged with shot composition information and camera position information as training data, and a shot time and location recognition model generation unit 200 (shown in FIG. 3), which generates a neural network model for predicting a shot time and a shot location using a video shot tagged with shot time information and shot location information as training data.

When it stores a plurality of video shots, the video shot analysis apparatus 300 extracts the same place/time information in content and composition information of the video shots and stores the same along with the video shots in order to make it easy to search for and use a video shot having a specific composition. That is, when a user uploads all of video shots taken in order to produce a single piece of image content, the video shot analysis apparatus 300 analyzes the shot composition of each of the video shots, the position of a camera when the video shot was taken, the shot location where the video shot was taken, and the shot time when the video shot was taken, and then stores the analyzed information in the video shot DB 20 by tagging the video shot with the same. According to an embodiment, the shot composition and quality of the video shot are measured, the place and time represented by the image of the video shot are additionally analyzed, and the video shot is tagged with the measured and analyzed information. A detailed description thereof will be made later with reference to FIGS. 4 to 6.

The video shot search service provision apparatus 400 provides a function through which a producer is able to search the video shot DB 20 using items with which video shots stored therein are tagged as multiple search conditions when finally editing content. Here, when video shots having the same composition are present, a better video shot is ranked higher in the search result by determining the suitability of composition, and suitable composition may be preferentially proposed in consideration of the flow of the shot composition of the previously produced scene. For example, when video shots are sequentially selected, the shot composition suitable for the current scene is proposed in consideration of the previously selected composition by analyzing a shot composition sequence based on film grammar in order to help a producer select a video shot. This will be described in detail later with reference to FIG. 7.

Figure 2:
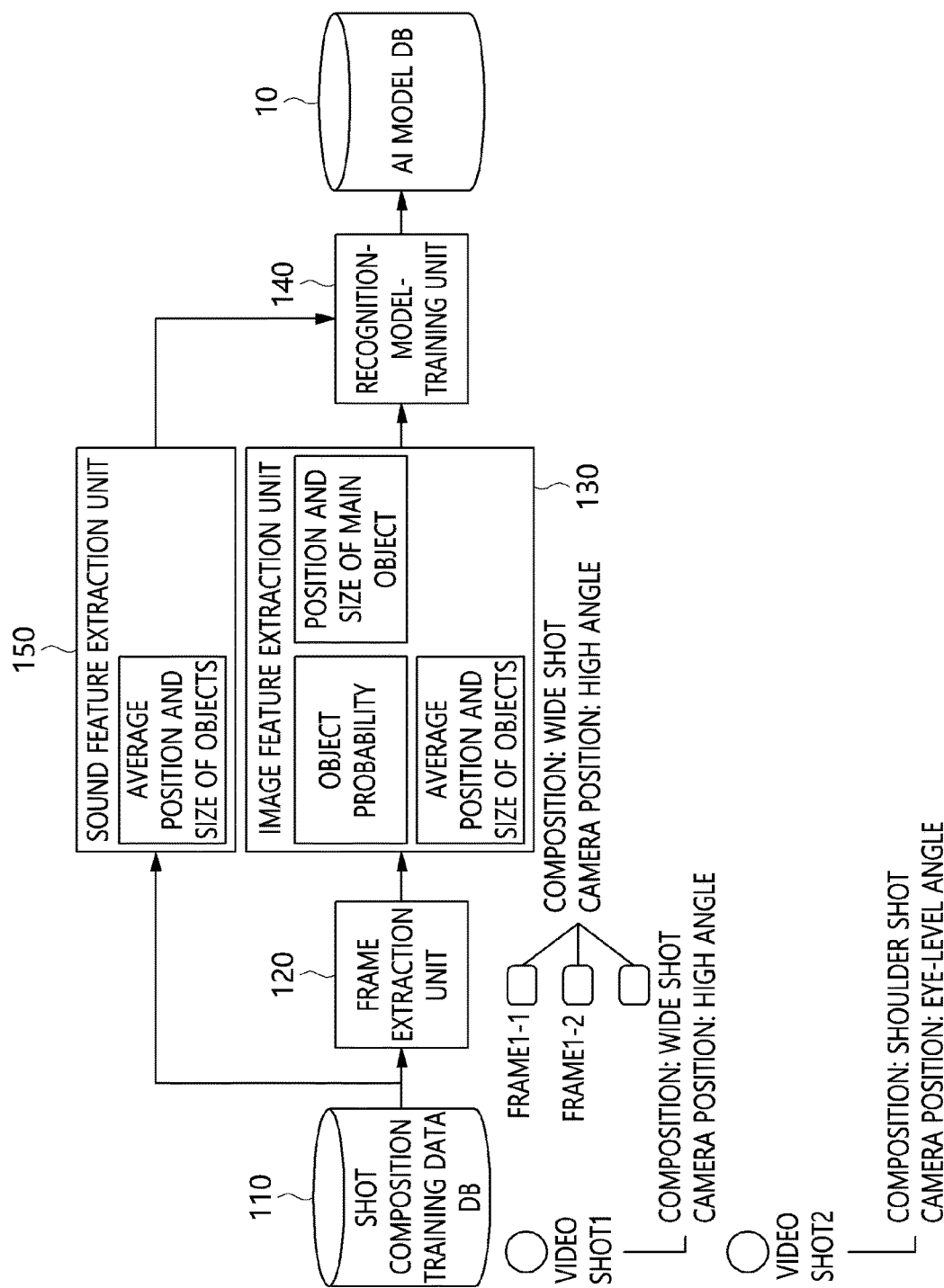
FIG. 2 is a block diagram of a shot composition recognition model generation unit according to an embodiment.

FIG. 2 is a block diagram of a shot composition recognition model generation unit according to an embodiment.

Referring to FIG. 2, the shot composition recognition model generation unit 100 may include a shot composition training data DB 110, a frame extraction unit 120, an image feature extraction unit 130, and a recognition-model-training unit 140. Also, a sound feature extraction unit 150 may be further included therein.

The shot composition training data DB 110 stores training data that is used for training a shot composition recognition model, and video shots that have not been edited and information about the shot composition of each of the video shots and a camera position when the video shot was taken, with which the corresponding video shot is tagged, may be stored as the training data.

Here, shot composition may be defined as at least one of an extreme long shot, a long shot, a full shot, a knee shot, a waist shot, a bust shot, a close shot, a close-up shot, an extreme close-up shot, and an over-the-shoulder shot.

Also, each type of shot composition may be classified as at least one of a high-angle shot, a low-angle shot, and an eye-level shot depending on the camera position.

Accordingly, each of the multiple video shots may be stored after being tagged with one of the above-described shot composition information and camera position information. For example, as shown in FIG. 2, video shot 1 may be stored after being tagged with information indicating a wide shot and a high angle, and video shot 2 may be stored after being tagged with information indicating a shoulder shot and an eye-level angle.

The frame extraction unit 120 extracts a predetermined number of important frames for each of the video shots stored in the shot composition training data DB 110, thereby forming data for each frame. Accordingly, the shot composition recognition model to be generated is trained to predict, when a single frame is input, the shot composition and the camera position pertaining to the video shot in which the corresponding frame is included.

To this end, features are extracted from the extracted frame, and image features and sound effect features may be extracted as the features.

The image feature extraction unit 130 may extract an object probability, the position and size of a main object (a person/an animal/a vehicle/or the like), and the mean and variance of the sizes of all objects from the extracted frame. This is based on the fact that the frame composition makes a difference in the sizes and shapes of the shown objects. Here, an image recognition algorithm such as a CNN may be used for the image feature extraction unit 130.

The recognition-model-training unit 140 trains a shot composition recognition model, which is a neural network model, to predict shot composition information and camera position information with which a frame is tagged when the features, extracted from the frame by the image feature extraction unit 130, are input.

Here, the shot composition recognition model is any of all types of classification models capable of using the extracted features, and an algorithm such as Inception, ResNet, or the like may be used therefor.

Additionally, the sound feature extraction unit 150 may extract an audio spectrum from each of the video shots. Here, the sound features are extracted for each video shot, rather than for each frame extracted from the video shot, and frames extracted from the same video shot may share the same sound features.

Here, the recognition-model-training unit 140 may use the sound features as the input of the shot compilation recognition model, along with the image features extracted by the image feature extraction unit 130. These sound features are used in order for the shot composition recognition model to be trained in consideration of information about an audio situation according to shot composition (e.g., shot composition frequently accompanied by dialogue between characters, shot composition of a long shot frequently accompanied only by background noise, or the like).

The shot composition recognition model trained as described above may be stored in the AI model DB 10.

Figure 3:
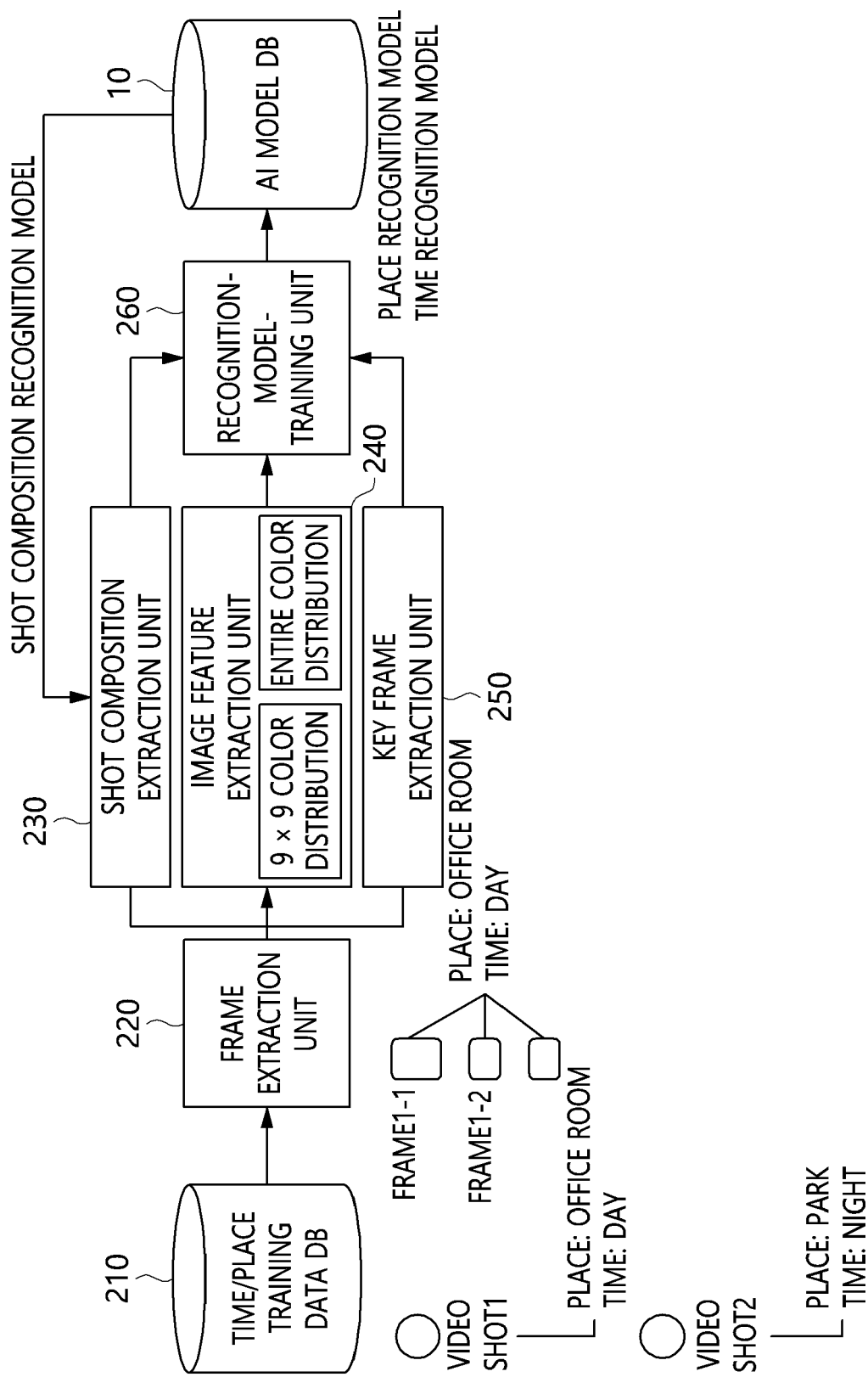
FIG. 3 is a schematic block diagram of a shot time and location recognition model generation unit according to an embodiment.

FIG. 3 is a schematic block diagram of a shot time and location recognition model generation unit according to an embodiment.

Referring to FIG. 3, the shot time and location recognition model generation unit 200 may include a time/place training data DB 210, a frame extraction unit 220, a shot composition extraction unit 230, an image feature extraction unit 240, a key frame extraction unit 250, and a recognition-model-training unit 260.

The time/place training data DB 210 stores training data that is used for training a shot time recognition model and a shot location recognition model, and video shots that have not been edited and information about the shot location where each of the video shots was taken and the shot time when the video shot was taken, with which the video shot is tagged, may be stored as the training data.

Here, the shot time may be defined as, for example, day, night, morning, or evening, and the shot location may be defined as, for example, an office room, a park, a classroom, or the like.

Therefore, each of the multiple video shots may be stored after being tagged with one of the above-described shot location information and shot time information. For example, as shown in FIG. 3, video shot 1 may be stored after being tagged with information indicating an office room during the day, and video shot 2 may be stored after being tagged with information indicating a park at night.

The frame extraction unit 220 extracts a predetermined number of important frames for each of the video shots stored in the time/place training data DB 210, thereby forming data for each frame. Accordingly, the shot time recognition model may be trained to predict, when a single frame is input, the shot time at which the video shot in which the corresponding frame is included was taken, and the shot location recognition model may be trained to predict, when a single frame is input, the shot location where the video shot in which the corresponding frame is included was taken.

To this end, predetermined features may be extracted from the extracted frame and used as the input of the shot time recognition model and the shot location recognition model. Here, at least one of shot composition, an image feature, and a key frame may be extracted as the features.

The shot composition extraction unit 230 predicts shot composition from the extracted frame based on the shot composition recognition model, which is generated by the shot composition recognition model generation unit 100 and stored in the AI model DB 10.

The image feature extraction unit 240 extracts color distribution from the extracted frame. This is because the color distribution of the frame may vary depending on the shot time and the shot location. For example, when the shot time is the time of sunset in the evening, red may occupy a large portion of the color distribution of the frame, and when the shot location is the beach, blue may occupy a large portion of the color distribution of the frame.

Here, the color distribution of multiple segmented areas of the frame (e.g., the color distribution of each of the 9×9 segmented areas of the frame) and the color distribution of the entire frame are extracted. This is because both the case in which the place and time information is represented only in a limited area depending on the shot composition (e.g., a bust shot, a close shot, an over-the-shoulder shot, a knee shot, a waist shot, or the like) and the case in which the place and time information is represented in the entire frame area depending on the shot composition (e.g., an extreme long shot, a long shot, a full shot, or the like) are considered.

Also, the key frame extraction unit 250 extracts a representative frame, among the extracted frames, as a feature.

The recognition-model-training unit 260 trains the shot location recognition model to predict shot location information with which the frame is tagged when at least one of shot composition, the color distribution of the frame, and the key frame is input.

Also, the recognition-model-training unit 260 trains the shot time recognition model to predict shot time information with which the frame is tagged when at least one of shot composition, the color distribution of the frame, and the key frame is input.

Here, the recognition model is any of all types of classification models capable of using the extracted features, and an algorithm, such as Inception, ResNet, or the like may be used therefor.

The shot location recognition model and the shot time recognition model, which are trained as described above, may be stored in the AI model DB 10.

Figure 4:
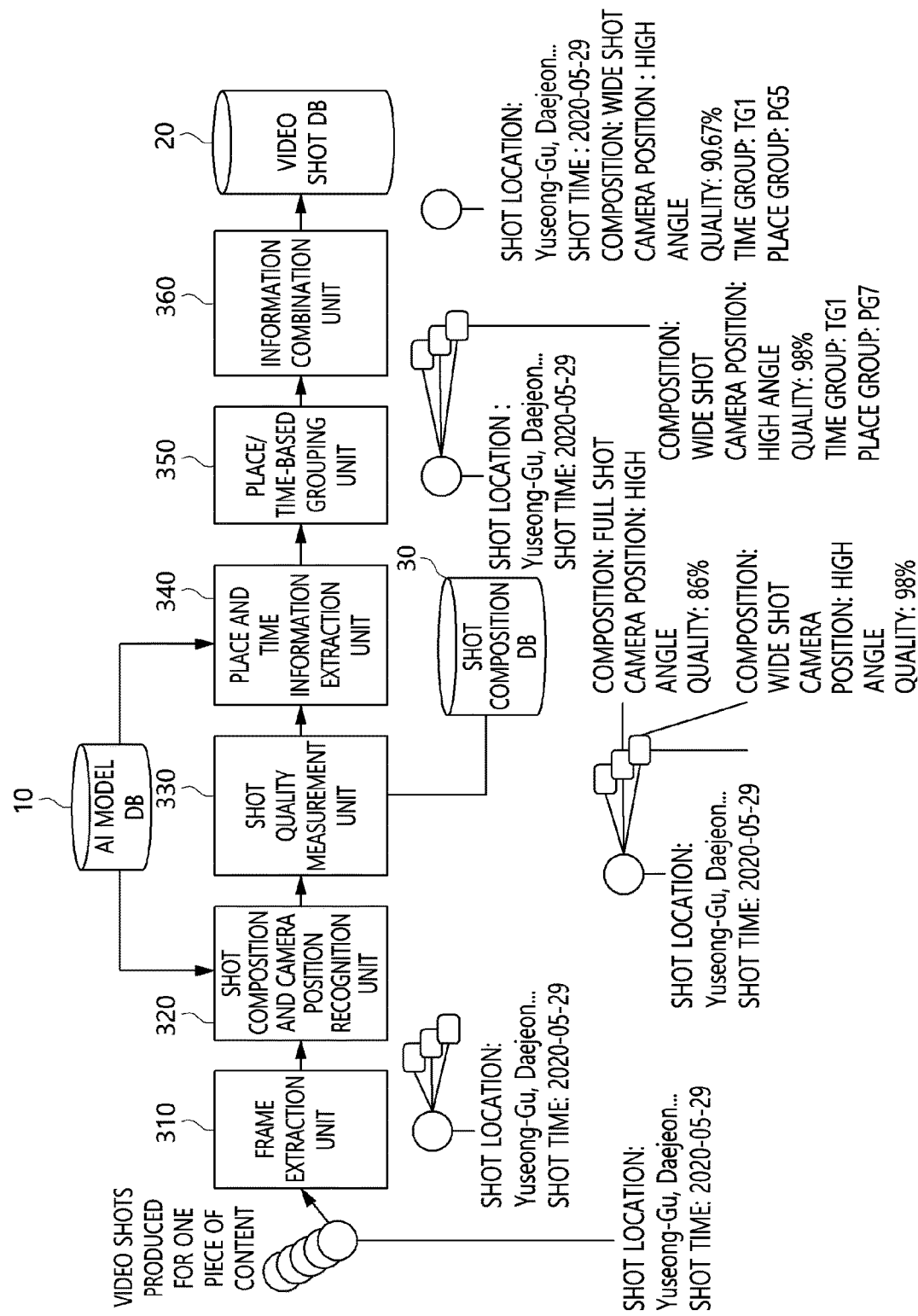
FIG. 4 is a schematic block diagram of a video shot analysis apparatus according to an embodiment.
Figure 5:
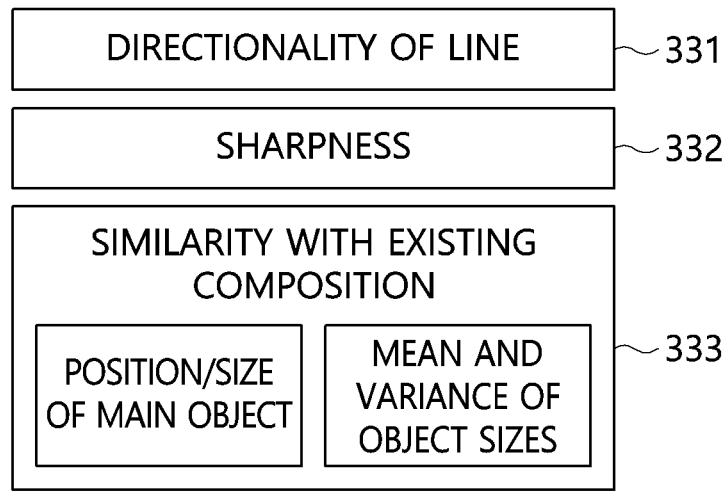
FIG. 5 is an exemplary view illustrating attributes considered by a quality measurement unit according to an embodiment.
Figure 6:
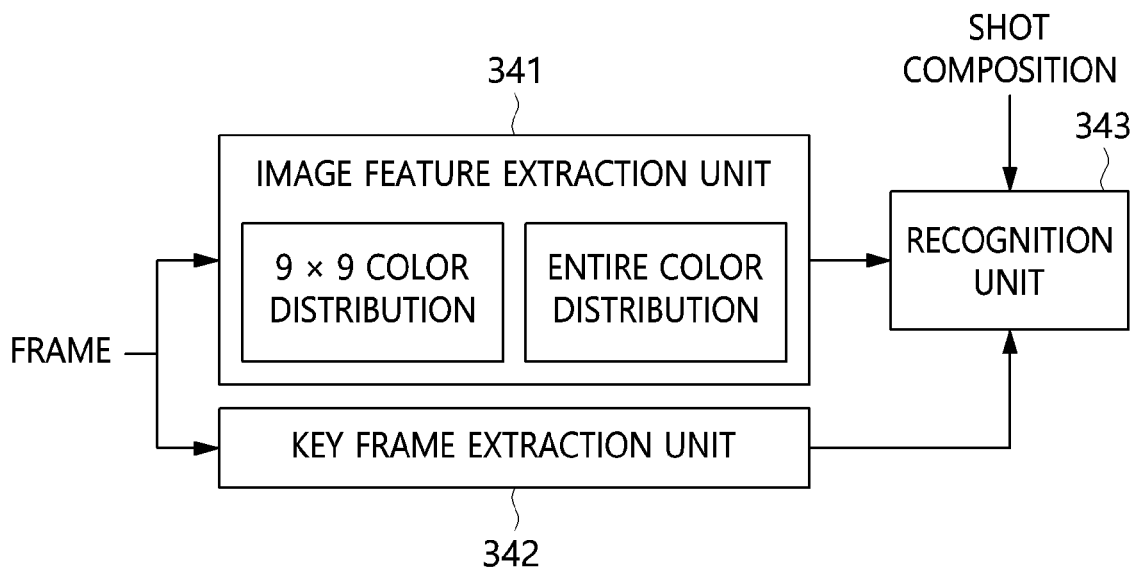
FIG. 6 is a schematic block diagram of a place and time information extraction unit according to an embodiment.

FIG. 4 is a schematic block diagram of a video shot analysis apparatus according to an embodiment, FIG. 5 is an exemplary view illustrating attributes considered by a quality measurement unit according to an embodiment, and FIG. 6 is a schematic block diagram of a place and time information extraction unit according to an embodiment.

Referring to FIG. 4, the video shot analysis apparatus 300 may include a frame extraction unit 310, a shot composition and camera position recognition unit 320, a shot quality measurement unit 330, a place and time information extraction unit 340, a place/time-based grouping unit 350, and an information combination unit 360.

The frame extraction unit 310 may extract a predetermined number of important frames for each of video shots input thereto.

The shot composition and camera position recognition unit 320 recognizes shot composition and a camera position for the extracted frame based on the shot composition recognition model stored in the AI model DB 10.

When the recognized shot composition and the frame, of which the camera position information is recognized, are input, the shot quality measurement unit 330 measures the quality of the frame in consideration of various factors.

Here, the factors based on which the shot quality is measured may include the directionality of lines 331, sharpness 332, and similarity with the existing composition 333, as shown in FIG. 5.

Here, the directionality of lines 331 indicates the degree of uniformity of the directions of main lines included in the frame, and may be represented as a value ranging from 0 to 1.0.

The sharpness 332 indicates the clarity of an image, and may be represented as a value ranging from 0 to 1.0.

The similarity with the existing composition 333 may be the maximum similarity (ranging from 0 to 1.0) measured by comparing the position and size of a main object (a person/an animal/a vehicle/or the like) and the mean and variance of the sizes of all objects appearing in the frame based on the shot composition and camera position data detected from a previously constructed shot composition DB 30.

Accordingly, the shot quality measurement unit 330 may calculate a shot quality score by totaling scores for the respective shot quality measurement factors.

The place and time information extraction unit 340 recognizes a shot location and a shot time for the extracted frame using the shot location recognition model and the shot time recognition model, which are stored in the AI model DB 10.

Referring to FIG. 6, the place and time information extraction unit 340 may include an image feature extraction unit 341, a key frame extraction unit 342, and a recognition unit 343.

First, the shot composition extraction unit 230 predicts the shot composition of a frame based on a shot composition detection model stored in the AI model DB 10.

The image feature extraction unit 341 extracts the color distribution of the frame. Here, the color distribution of each of multiple segmented areas of the frame (e.g., the color distribution of each of the 9×9 segmented areas of the frame) and the color distribution of the entire frame are extracted.

Also, the key frame extraction unit 342 uses the extracted frame as a feature.

The recognition unit 343 predicts the shot location and the shot time of the frame when at least one of the shot composition and camera position previously recognized by the shot composition and camera position recognition unit 320, the color distribution of the frame extracted by the image feature extraction unit 341, and the key frame extracted by the key frame extraction unit 342 is input.

The place/time-based grouping unit 350 groups frames corresponding to similar shot locations and similar shot times together through clustering of the frames based on the predicted shot location and shot time. Here, the number of groups based on the shot location and the shot time may be set by a user.

The information combination unit 360 combines pieces of information, which are recognition results acquired for the respective frames, for each video shot and stores the combined pieces of information in the video shot DB 20 by tagging the video shot with the same.

Here, the combined information may include at least one of shot composition, a camera position, a shot quality, a place code, a time code, an actual shot location, and an actual shot time.

Here, in the case of the shot composition, the shot quality scores of the respective frames, measured by the shot quality measurement unit 330, are totaled for each type of shot composition, and the shot composition having the highest shot quality score may become the shot composition of the video shot.

In the case of the camera position, the shot quality scores of the respective frames, measured by the shot quality measurement unit 330, are totaled for each camera position, and the camera position having the highest shot quality score may become the camera position of the video shot.

The shot quality may be the mean of the quality scores of the frames recognized as having the selected shot composition.

The time group may be set to the time group having the largest number of frames, among the groups that are set for the frames by the place/time-based grouping unit 350.

The place group may be set to the place group having the largest number of frames, among the groups that are set for the frames by the place/time-based grouping unit 350.

Figure 7:
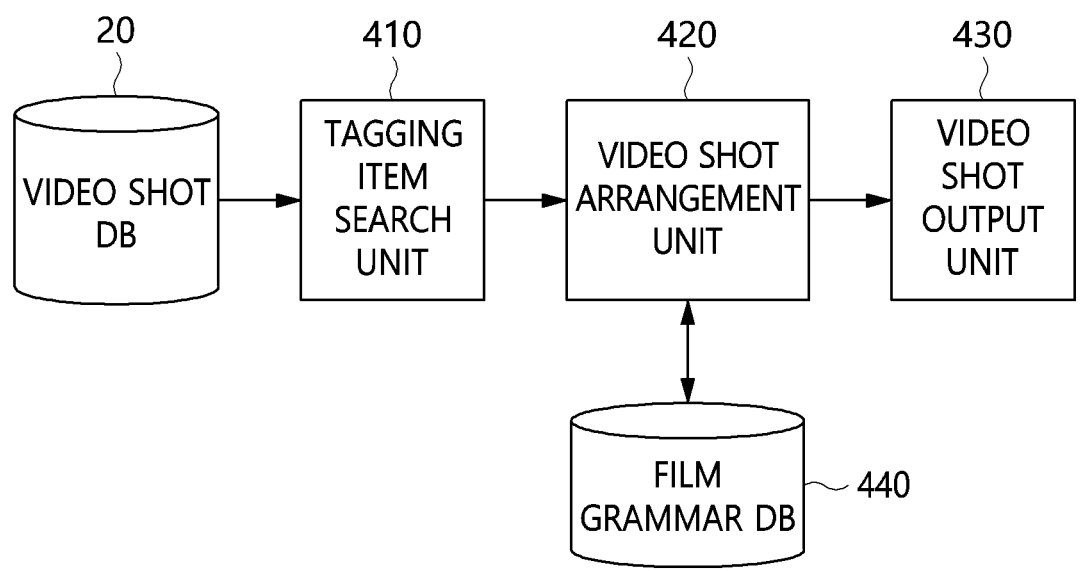
FIG. 7 is a schematic block diagram of an apparatus for providing a video shot search service according to an embodiment.

FIG. 7 is a schematic block diagram of a video shot search service provision apparatus according to an embodiment.

Referring to FIG. 7, the video shot search service provision apparatus 400 may include a tagging item search unit 410, a video shot arrangement unit 420, and a video shot output unit 430.

The tagging item search unit 410 searches the video shot DB 20 for at least one video shot matching a search keyword when one of tagging items is input by a user as the search keyword.

Here, the tagging items may include at least one of shot composition, a camera position, an actual shot location, and an actual shot time.

Here, when multiple video shots are found, the video shot arrangement unit 420 may arrange the found video shots according to a predetermined criterion.

According to an embodiment, the video shot arrangement unit 420 may sort the video shots by referring to other tagging items with which each of the multiple video shots is tagged. For example, the video shots may be sorted in order of shot quality with which the video shots are tagged.

According to another embodiment, the video shot arrangement unit 420 may sort the video shots based on the optimal shot composition that most naturally matches the shot composition of a previously selected video shot based on film grammar.

Here, the film grammar is film grammar information for each scene and storyline used in existing films, and may be stored in a film grammar DB 440. For example, in film grammar named "telephone call", multiple bust shots taken from an eye-level angle are sequentially used, and the position of the main object is switched when the speaker is changed. Accordingly, when a "telephone call" scene is selected as the scene intended by a user, the video shot arrangement unit 420 sorts the found video shots in order from the video shot tagged with the shot composition information that most naturally matches the shot composition information of the scene that was just formed by the user based on the film grammar data named "telephone call".

The video shot output unit 430 outputs the found video shots, in which case the video shots are output in the order set by the video shot arrangement unit 420.

Figure 8:
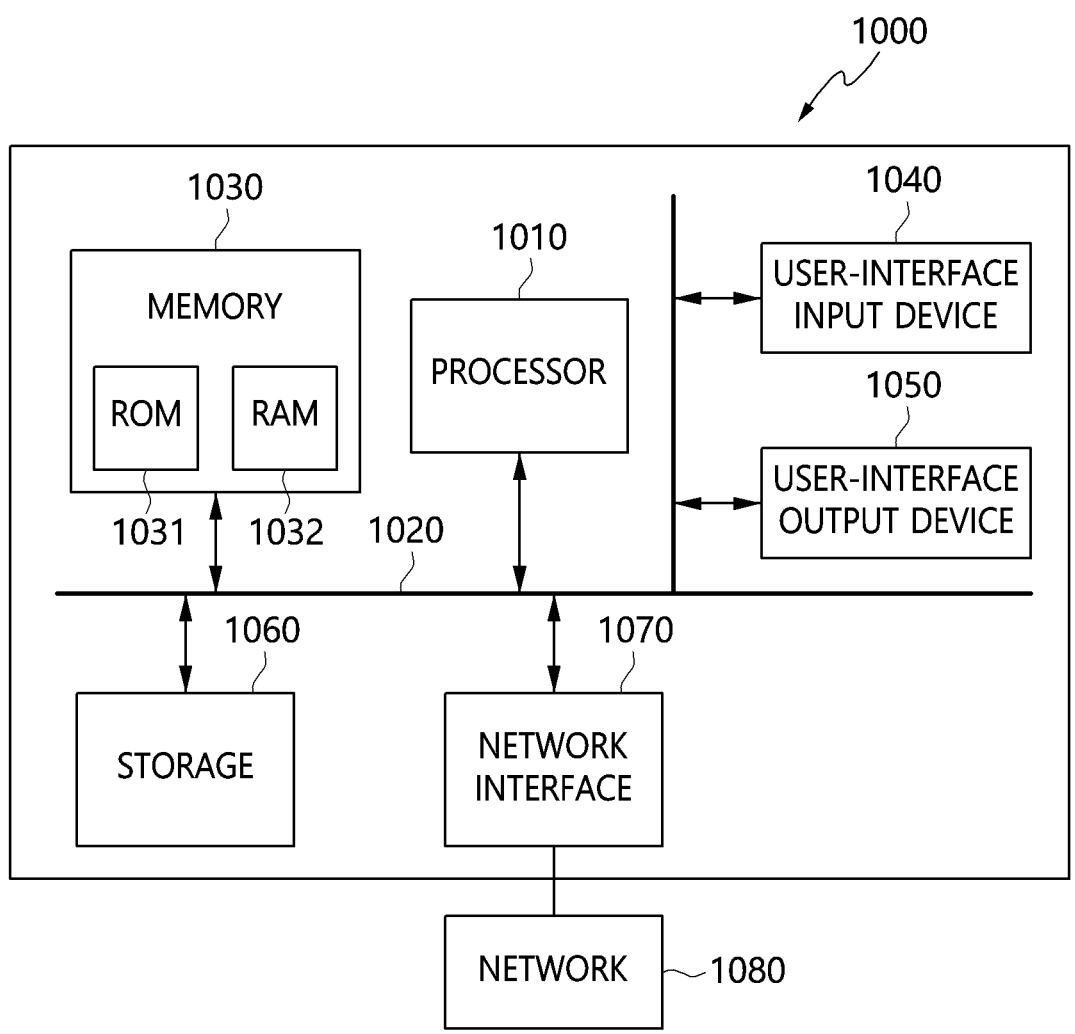
FIG. 8 is a view illustrating a computer system configuration according to an embodiment.

FIG. 8 is a view illustrating a computer system configuration according to an embodiment.

The search system based on analysis of video shots of image content and each of components included therein according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected with a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a nonvolatile medium, a detachable medium, a non-detachable medium, a communication medium, and an information delivery medium. For example, the memory 1030 may include ROM 1031 or RAM 1032.

An embodiment is expected to improve a production environment for commercial image content, such as a broadcast, a movie, and the like, in which it is required to take thousands of video shots and search the same one by one.

Although embodiments of the present invention have been described with reference to the accompanying drawings, those skilled in the art will appreciate that the present invention may be practiced in other specific forms without changing the technical spirit or essential features of the present invention. Therefore, the embodiments described above are illustrative in all aspects and should not be understood as limiting the present invention.

What is claimed is:

1. An apparatus for training a recognition model, comprising:
    at least one program and memory in which the program is recorded; and
    a processor for executing the at least one program,
    wherein the at least one program includes
    a shot composition recognition model generation unit for generating a neural network model for predicting a shot composition and a camera position using a video shot tagged with shot composition information and camera position information as training data, and
    a shot time and location recognition model generation unit for generating a neural network model for predicting a shot time and a shot location using a video shot tagged with shot time information and shot location information as training data,
    wherein the shot time and location recognition model generation unit comprises a recognition-model training unit for training a shot location recognition model or a shot time recognition model to predict shot location information or shot time information with which the at least one frame is tagged when at least one of a shot composition of an extracted frame, a color distribution of the extracted frame, and a key frame is input.

2. The apparatus of claim 1, wherein the shot composition recognition model generation unit comprises:
    a frame extraction unit for extracting the extracted frame from the video shot and forming data for the extracted frame;
    an image feature extraction unit for extracting image features related to an object included in the extracted frame; and
    a recognition-model-training unit for training a shot composition recognition model, which is a neural network model, to predict shot composition information and camera position information, with which the extracted frame is tagged, when the extracted image features are input.

3. The apparatus of claim 2, wherein the shot composition includes at least one of an extreme long shot, a long shot, a full shot, a knee shot, a waist shot, a bust shot, a close shot, a close-up shot, an extreme close-up shot, and an over-the-shoulder shot.

4. The apparatus of claim 3, wherein each type of the shot composition is classified as at least one of a high-angle shot, a low-angle shot, and an eye-level shot depending on a camera position.

5. The apparatus of claim 2, wherein:
    the shot composition recognition model generation unit further comprises a sound feature extraction unit for extracting an audio spectrum from the video shot, and
    the recognition-model-training unit trains the shot composition recognition model, which is a neural network model, to predict the shot composition information and the camera position information with which the video shot is tagged when the audio spectrum is input.

6. The apparatus of claim 1, wherein the shot time and location recognition model generation unit further comprises:
    a frame extraction unit for extracting the extracted frame from the video shot and forming data for the extracted frame.

7. The apparatus of claim 6, wherein the shot time and location recognition model generation unit further comprises:
    between the frame extraction unit and the recognition-model-training unit,
    at least one of
    a shot composition extraction unit for predicting the shot composition of the extracted frame based on a previously trained shot composition recognition model;
    an image feature extraction unit for extracting the color distribution from the extracted frame; and
    a key frame extraction unit for extracting a representative frame, among a plurality of ones of the extracted frame.

8. The apparatus of claim 7, wherein the image feature extraction unit extracts a color distribution of each of multiple segmented areas of the extracted frame and a color distribution of an entirety of the extracted frame.

9. An apparatus for analyzing a video shot, comprising:
    at least one program and memory in which the program is recorded; and
    a processor for executing the at least one program,
    wherein the at least one program includes
    a frame extraction unit for extracting at least one frame from a video shot;
    a shot composition and camera position recognition unit for predicting a shot composition and a camera position for the extracted at least one frame based on a previously trained shot composition recognition model;
    a place and time information extraction unit for predicting a shot location and a shot time for the extracted at least one frame based on a previously trained shot location recognition model and a previously trained shot time recognition model; and
    an information combination unit for combining pieces of information, which are respectively predicted for the extracted at least one frame, for each video shot and tagging the video shot with the combined pieces of information,
    wherein the place and time information extraction unit predicts the shot location and the shot time for the extracted at least one frame by inputting at least one of a shot composition of the extracted at least one frame, which is predicted based on the previously trained shot composition recognition model, a color distribution of the extracted at least one frame, and a key frame, to the shot location recognition model and the shot time recognition model.

10. The apparatus of claim 9, further comprising:
    a shot quality measurement unit for measuring a shot quality of the extracted at least one frame based on predetermined factors,
    wherein the information combination unit selects information to be combined based on the measured shot quality.

11. The apparatus of claim 10, wherein:
the information to be combined includes at least one of a shot composition, a camera position, and a shot quality, and
the information combination unit selects the shot composition based on a shot quality score totaled for each type of shot composition, selects the camera position based on a shot quality score totaled for each camera position, calculates the shot quality as an average of quality scores of frames recognized as having the selected shot composition, and uses the shot composition, the camera position, and the shot quality as the information to be combined.

12. The apparatus of claim 10, wherein the predetermined factors include at least one of directionality of lines, which is a degree of uniformity of directions of main lines included in the extracted at least one frame, sharpness, which is a degree of clarity of the lines, and a similarity acquired by comparing previously constructed shot composition data with information about an object included in the extracted at least one frame.

13. The apparatus of claim 11, further comprising:
a place/time-based grouping unit for clustering frames into a predetermined number of groups according to the predicted shot location and shot time,
wherein the information combination unit selects the information to be combined based on the resultant groups.

14. The apparatus of claim 13, wherein:
the information to be combined includes at least one of a time group and a place group, and
the information combination unit decides on the time group and the place group to be used as the information to be combined based on a number of frames included in each of the groups.

15. An apparatus for providing a video shot search service, comprising:
at least one program and memory in which the program is recorded; and
a processor for executing the program,
wherein the program includes
a tagging item search unit for searching for a video shot tagged with at least one item corresponding to a search keyword when the search keyword is input,
a video shot output unit for outputting the found at least one video shot, and
a DB for storing film grammar information pertaining to an already produced film,
wherein the video shot arrangement unit sorts the video shots in an order from a video shot tagged with shot composition information that best matches shot composition information of a previously selected video shot based on the film grammar information.

16. The apparatus of claim 15, wherein the item includes at least one of a shot composition, a camera position, an actual shot location, and an actual shot time.

17. The apparatus of claim 15, further comprising:
a video shot arrangement unit for sorting, when the found video shot comprises multiple video shots, the multiple video shots according to a predetermined criterion,
wherein the video shot output unit outputs the video shots in an order set by the video shot arrangement unit.

18. The apparatus of claim 17, wherein the video shot arrangement unit sorts the video shots by referring to other items with which each of the multiple video shots is tagged.

* * * * *